(12) United States Patent
Wong et al.

(10) Patent No.: US 9,356,460 B2
(45) Date of Patent: May 31, 2016

(54) METHOD AND APPARATUS OF FAST BATTERY CHARGING WITH UNIVERSAL HIGH POWER INPUT SOURCE

(71) Applicant: Texas Instruments Incorporated, Dallas, TX (US)

(72) Inventors: Sai Bun S. Wong, Irving, TX (US); Qiong M. Li, Allen, TX (US); Jinrong Qian, Plano, TX (US); Jonathan L. Britton, Knoxville, TN (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 131 days.

(21) Appl. No.: 14/338,771

(22) Filed: Jul. 23, 2014

(65) Prior Publication Data

US 2015/0035477 A1 Feb. 5, 2015

Related U.S. Application Data

(60) Provisional application No. 61/862,298, filed on Aug. 5, 2013, provisional application No. 61/929,288, filed on Jan. 20, 2014.

(51) Int. Cl.
*H02J 7/00* (2006.01)

(52) U.S. Cl.
CPC ............... *H02J 7/0068* (2013.01); *H02J 7/007* (2013.01); *H02J 2007/0062* (2013.01); *H02J 2007/0096* (2013.01)

(58) Field of Classification Search
CPC ...... Y02E 60/12; H02J 7/0042; H02J 7/0045; H02J 2007/0062; H02J 2007/0096; H02J 7/007; H02J 7/0052; H01M 10/46; H01M 10/44
USPC .......................................................... 320/107
See application file for complete search history.

(56) References Cited

U.S. PATENT DOCUMENTS

| | | | |
|---|---|---|---|
| 6,946,817 B2 | 9/2005 | Fischer et al. | |
| 7,268,561 B2 | 9/2007 | Zhu | |
| 7,675,571 B2 | 3/2010 | Cheng et al. | |
| 7,895,385 B2 | 2/2011 | Raju | |

(Continued)

FOREIGN PATENT DOCUMENTS

| RU | 2400904 | 9/2010 |
|---|---|---|
| WO | WO2008117139 | 10/2008 |

OTHER PUBLICATIONS

Universal Serial Bus 3.1 Specification, Hewlett-Packard Company, Intle Corporation, Microsoft Corporation, Renesas Corporation, ST-Ericsson, Texas Instruments, Revision 1.0, Jul. 26, 2013, 631 pgs. (Uploaded in 7 parts).

(Continued)

*Primary Examiner* — Arun Williams
(74) *Attorney, Agent, or Firm* — William B. Kempler; Frank D. Cimino

(57) ABSTRACT

Methods, electronic devices and USB charger apparatus are presented for fast USB charging, in which a high voltage master of the device detects a connected high voltage charger and selectively connects a current circuit to source or sink a current to or from one USB cable data signal conductor while providing a non-zero voltage to the other USB cable data signal conductor to configure the charger apparatus to provide charging power at a particular high voltage level above a nominal voltage level.

20 Claims, 7 Drawing Sheets

(56) References Cited

U.S. PATENT DOCUMENTS

| | | | |
|---|---|---|---|
| 8,386,814 B2 | 2/2013 | Tom et al. | |
| 8,442,586 B2 | 5/2013 | Danis et al. | |
| 2003/0122523 A1* | 7/2003 | Kim | H02J 7/007 320/112 |
| 2007/0188132 A1 | 8/2007 | Kim et al. | |
| 2008/0265838 A1 | 10/2008 | Garg et al. | |
| 2010/0064148 A1* | 3/2010 | Ho | H02J 1/00 713/300 |
| 2011/0016334 A1 | 1/2011 | Tom et al. | |
| 2011/0016341 A1 | 1/2011 | Tom et al. | |
| 2011/0298426 A1 | 12/2011 | Hussain et al. | |
| 2012/0096286 A1 | 4/2012 | Huang et al. | |
| 2012/0119696 A1 | 5/2012 | Picard | |
| 2012/0217928 A1* | 8/2012 | Kulidjian | B60L 3/0069 320/109 |
| 2013/0191653 A1* | 7/2013 | Shih | H01M 10/44 713/300 |
| 2013/0290765 A1 | 10/2013 | Waters et al. | |

OTHER PUBLICATIONS

USB Battery Charging 1.2 Compliance Plan, Copyright 2011 USB Implementers Forum Inc., Revision 1.0, Oct. 12, 2011, 166 pgs. (Uploaded in 3 parts).

Battery Charging Specification, Copyright 2010 USB Implementers Forum Inc., Revision 1.2, Dec. 7, 2010, 71 pgs.

The I2C-Bus and How to Use it (Including Specifications), Phillips Semiconductors, Apr. 1995 update, 24 pgs.

Universal Serial Bus PS Interface White Paper, Editor Richard Wahler, Revision 1.00, Apr. 14, 2014, 19 pgs.

UM 10204 I2C-Bus Specification and User Manual, NXP, Rev. 5-9, Oct. 2012, 64 pgs.

JOOSTING, Qualcomm Quick Charge 2.0 Smartphone Charger Reference Design, EE Times, Europe, Oct. 21, 2013, 2 pgs.

PCT Search Report mailed Aug. 5, 2014.

* cited by examiner

METHOD AND APPARATUS OF FAST BATTERY CHARGING WITH UNIVERSAL HIGH POWER INPUT SOURCE

REFERENCE TO RELATED APPLICATIONS

This application claims priority to and the benefit of U.S. Provisional Patent Application Ser. No. 61/862,298 that was filed on Aug. 5, 2013 and is entitled METHOD AND APPARATUS OF FAST BATTERY CHARGING WITH UNIVERSAL HIGH POWER INPUT SOURCE, and also claims priority to and the benefit of U.S. Provisional Patent Application Ser. No. 61/929,288 that was filed on Jan. 20, 2014 and is entitled METHOD AND APPARATUS OF FAST BATTERY CHARGING WITH UNIVERSAL HIGH POWER INPUT SOURCE, the entireties of which applications are incorporated by reference herein.

FIELD OF THE INVENTION

The present disclosure relates to Universal Serial Bus (USB) charging apparatus for charging portable devices using a USB cable.

BACKGROUND

USB ports are found on many portable devices such as laptop computers, tablets, mobile phones, MP3 players, etc., and are also provided on desktop computers, automobile dashboard consoles, etc., to provide interconnection for serial communications between devices. The USB standards provide for charging capability by which mobile phones or other portable devices can be operated using power provided through a USB cable to the device. This power feature of the USB system also advantageously allows battery-powered devices to be charged using power provided from a connected USB-compatible device. Dedicated charging equipment is available, for example, having multiple USB ports for charging various portable devices, even where no serial communication is needed between the charging equipment and the device. As portable device functionality expands and as customer expectations as to operating time between charges increases, device battery capacity has been enhanced, but this also increases the time to fully charge the battery or batteries of an electronic device. Faster charging can be achieved by increasing the charger efficiency and/or output power level. Switching power supply architectures such as synchronous switching buck converters can achieve high efficiency, for example, up to 95%, and thus increasing the charger power level is the primary means of reducing charging times for portable electronic devices. However, proper device operation requires correct matching between the power levels of the charging source and the charged device.

Proprietary adapters have been developed, typically providing a fixed voltage level as a charging source for fast charging requirements of designated portable device. However, the fixed voltage provided by proprietary adapters may not be suitable for charging certain devices. Accordingly, this approach typically requires use of proprietary mechanical and/or electrical interfaces to ensure only target portable equipment can be charged, thereby preventing universal usage. A continuing problem for fast battery charging is therefore how to provide high input power to a device while maintaining universal charging capability. USB adapters are the most common universal power source for portable battery-powered electronic devices such as smartphones and tablet computers, where the USB Battery Charging standards allow different portable devices to share the same power source. The original USB implementations provided for charging at a nominal voltage level of 5V with a charging current limited to 1 A, and subsequent revisions to the standards (e.g., USB 3.0, 3.1, etc.) provide for fast charging at higher levels, thus accommodating up to 100 W charging. However, mismatching between USB charging sources or charging adapters and charged devices can hamper proper device operation and/or prevent the ability to minimize charging time. The USB-PD standard provides a communication interface with the device modulating a high frequency signal on the VBUS power line to allow communications with the USB adapter, but this approach requires filter circuitry to demodulate control signals and limits the utility in mobile phone and other cost sensitive applications. Accordingly, there is a need for improved universal USB charger apparatus and electronic devices by which the charging power level can be maximized without degradation of the charger or charged electronic device for fast charging.

SUMMARY

Presently disclosed embodiments provide apparatus and techniques for charging an electronic device via a USB cable connection in which a transmit circuit associated with the electronic device selectively applies sourcing or sinking current to one of a pair of USB cable data lines and connects a voltage source to the other data line to indicate a desired charging voltage level to a connected USB charger apparatus or high voltage (HV) adapter, without requiring high frequency signal modulation or filter circuitry or user actions, while facilitating fast charging within limitations dictated by the charged device.

In accordance with one or more aspects of the present disclosure, an electronic device is provided which includes a USB connector for receiving a USB cable for connection to an associated high voltage adapter or charging apparatus. The device further includes a load operative to receive electrical power at a nominal voltage level according to the nominal USB standard, as well as one or more high voltage levels above the nominal level. A transmit circuit is coupled with first and second USB connector conductive structures for electrical connection to corresponding first and second data signal conductors (e.g., DP or D+, and DN or D−) of the connected USB cable, where the transmit circuit is operative in multiple transmitter states. The transmit circuit includes a current circuit with a current source or a current sink which is selectively operative to source or sink a non-zero current to or from one of the first and second conductive structures in the second transmitter state, as well as a voltage source selectively operative in the second transmitter state to provide a non-zero voltage to the other of the first and second conductive structures. The electronic device further includes a processor programmed to selectively place the transmit circuit in the first transmitter state to disable the transmit circuit so as to instruct the associated high voltage adapter to provide electrical power to the electronic device via the USB cable at the nominal voltage level, or to selectively place the transmit circuit in the second transmitter state to instruct the associated high voltage adapter to provide electrical power to the device at one of the high voltage levels above the nominal level. In this manner, the electronic device can program or configure the associated high voltage adapter to selectively provide charging power at an above-nominal level within proper limits of the electronic device without requiring user interaction or proprietary electrical or mechanical interconnection limitations.

In certain embodiments, the electronic device is capable of signaling a single high voltage charging level, or multiple high voltage levels can be selected based on the connections of the current circuit and the voltage source with the data signal conductors of the USB cable. In one embodiment, the current circuit of the transmit circuit is coupled between the first conductive structure and a circuit ground to sink current from the first conductive structure in the second transmitter state, and the voltage source is coupled between the second conductive structure and the circuit ground to provide the non-zero voltage to the second conductive structure. In another possible implementation, these connections are reversed, with the current circuit coupled to sink current from the second conductive structure while the voltage source is operative in the second transmitter state to provide the non-zero voltage to the first conductive structure.

In further embodiments, the switching circuit is operative in a first switch state to connect the current circuit to the first conductive structure and to connect the voltage source to the second conductive structure. In a second switching state, the switching circuit connects the current circuit to the second conductive structure and connects the voltage source to the first conductive structure. In certain implementations, moreover, the device processor is programmed to selectively place the transmit circuit in the second transmitter state by placing the switching circuit in the first switch state, and may selectively place the transmit circuit in a third transmitter state by placing the switching circuit in the second switch state. In this manner, the electronic device can select from more than one high voltage charging configurations to facilitate fast charging. In certain embodiments, the processor is programmed to sequentially place the transmit circuit in the second and third states, in any order, so as to instruct the associated high voltage adapter to provide electrical power to the device at a third high voltage level. Thus, a single communication signaling link along the first and second data signal conductors of the USB cable provides a mechanism by which the electronic device can select from a number of different fast charging levels in an automated cost effective fashion.

In certain embodiments, the electronic device includes a transceiver circuit coupled with the first and second conductive structures of the USB connector, with the transceiver circuit selectively operative to provide bidirectional communications to exchange data with the associated high voltage adapter. In certain implementations, the processor is programmed to read data from the adapter via the transceiver circuit to determine high voltage capabilities of the adapter, and to write data to the adapter via the transceiver circuit to selectively instruct the adapter to provide electrical power via the USB cable at a particular one of the high voltage levels based at least in part on the high voltage capabilities of the associated high voltage adapter. In this manner, proper matching between the capabilities of USB adapters and charged electronic devices can be facilitated in automated fashion, with the device detecting the adapter capabilities and potentially selecting a best voltage match at or below its own capabilities. In certain implementations, moreover, the processor is programmed to repeatedly write to a particular register of the adapter after writing the configuration data, for example, to reset a watchdog timer implemented in the high voltage adapter. In this manner, the adapter can be ensured of a proper connection to the charged device while maintaining a high voltage charging level. In certain embodiments, the processor of the electronic device is programmed to selectively disable the current circuit after placing the transmit circuit in the second transmitter state in order to conserve power.

In accordance with further aspects of the present disclosure, a USB charger apparatus or adapter is provided, including a USB connector for receiving a USB cable to provide interconnection with an electronic device, where the connector includes first and second conductive structures for electrical connection to first and second data signal conductors of a connected USB cable. The adapter further includes a power supply coupled to selectively supply electrical power to the device via conductive structures of the USB connector at a nominal voltage level or at one or more high voltage levels above the nominal voltage level at least partially according to one or more configuration signals. A configuration circuit is operatively coupled with the power supply to provide at least one configuration signal according to one or more select signals, and a controller is coupled with first and second conductive structures of the USB connector to provide the select signal(s) to the configuration circuit. The controller includes a detector circuit to compare the voltage of at least one of the first and second conductive structures with a voltage reference, with the detector circuit providing a detector output signal in a first state when the compare voltage exceeds the voltage reference. In addition, the controller includes a select circuit operative to sense the polarity of a differential voltage across the first and second conductive structures, where the select circuit selectively provides one or more select signals according to the sensed polarity when the detector output signal is in the first state. In various embodiments, the controller facilitates detection of one or more electrical conditions of the USB cable data signal conductors controlled by a connected electronic device for configuration of the adapter power supply to facilitate fast charging without requiring demodulation and/or filter circuits.

In certain embodiments, the select circuit includes at least one comparator with inputs connected to the first and second conductive structures and an output providing a comparator output signal according to the sensed polarity of the differential voltage. At least one flip-flop is provided in the select circuit in certain embodiments, with a set input receiving the comparator output signal, along with an enable input and an inverted reset input coupled to receive the detector output signal, where an output of the flip-flop provides the select signal. In certain implementations, therefore, interruption in the USB cable connection, such as by user removal of the cable from the charged device or from the adapter can be sensed by the detector circuit to disable the flip-flop output thereby switching the power supply output back to the nominal level.

In certain embodiments, the configuration circuit provides the configuration signal or signals at least partially according to a plurality of binary select signals, where the controller provides the binary select signals according to the sensed polarity of the differential voltage and according to the detector output signal. In this manner, the adapter may be selectively programmed or instructed to provide one of a number of different high voltage charging levels. The configuration circuit in certain embodiments includes a resistive divider with first and second resistances coupled between the power supply output terminal and a circuit ground, with an intermediate node connecting the first and second resistances to control a configuration signal voltage provided to a feedback voltage input or other control input of the power supply. An additional resistance is provided in certain implementations along with a switching circuit operative at least partially according to the select signal to selectively connect the additional resistance in parallel with one of the first and second resistances so as to modify the configuration signal voltage, thereby adjusting the power supply output voltage level.

In certain embodiments, the controller comprises a transceiver circuit coupled with the first and second conductive structures and selectively operative to provide bidirectional communications to exchange data with the connected electronic device via the first and second data signal conductors of the USB cable. In certain implementations, the select circuit includes a processor programmed to provide data to the connected electronic device via the transceiver circuit to indicate high voltage capabilities of the power supply. The processor is further programmed to receive configuration data from the connected electronic device via the transceiver circuit, and to provide at least one select signal to the configuration circuit at least partially according to the received configuration data.

A method is provided in accordance with further aspects of the disclosure for fast charging an electronic device via a USB cable. The method includes detecting connection of a high voltage adapter to the electronic device via a USB cable, as well as selectively sourcing or sinking current to or from one of a first data signal conductor and a second data signal conductor of the USB cable while providing a non-zero voltage to another one of the data signal conductors in order to configure the adapter to provide charging power at a particular high voltage level above a nominal voltage level. In certain implementations, the method includes reading data from the connected high voltage adapter via the first and second data signal conductors to determine high voltage capabilities of the connected adapter, as well as writing configuration data to the adapter via the first and second data signal conductors to selectively instruct the adapter to provide power to the device in a particular one of a plurality of high voltage levels based at least partially on the high voltage capabilities of the connected adapter.

DESCRIPTION OF THE VIEWS OF THE DRAWINGS

The following description and drawings set forth certain illustrative implementations of the disclosure in detail, which are indicative of several ways in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings, in which.

DETAILED DESCRIPTION

Figure 1:
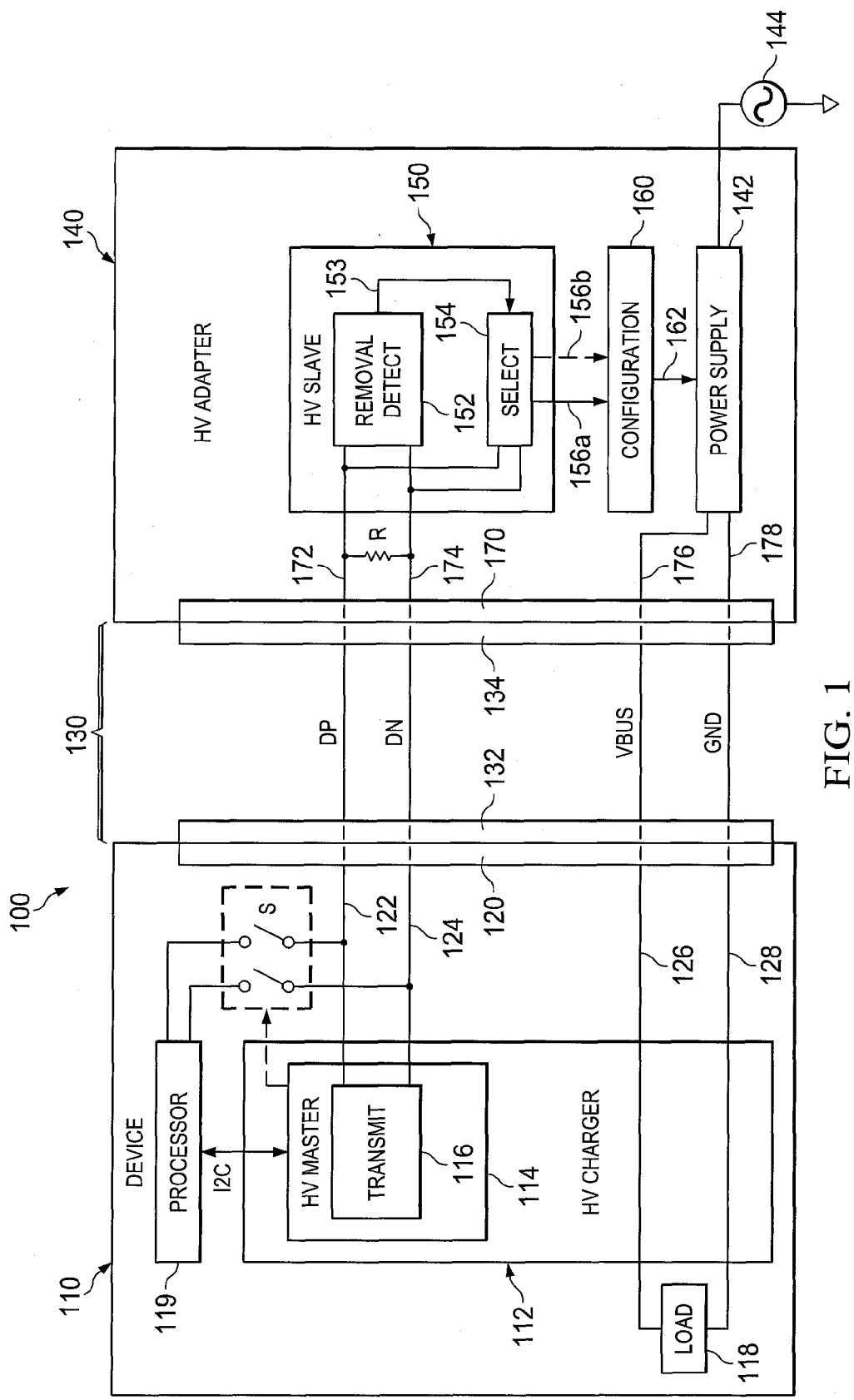
FIG. 1 is a schematic diagram illustrating an exemplary USB charging system with an electronic device connected to a high voltage adapter or charging apparatus using a USB cable, with the device including a high voltage charger with a transmit circuit for configuring the connected adapter by signaling on USB cable data signal conductors.

One or more embodiments or implementations are hereinafter described in conjunction with the drawings, wherein like reference numerals are used to refer to like elements throughout, and wherein the various features are not necessarily drawn to scale.

Referring initially to FIG. 1, a USB charging system 100 is shown including an electronic device 110 and a high voltage USB charger apparatus or USB high voltage (HV) adapter 140 connected via a USB cable 130 for powering or charging the device 110 using power delivered from the adapter 140 via the USB cable 130. The device 110 can be any electronic device, including without limitation a laptop computer, a tablet computer, a mobile phone, etc., having a load 118 which can receive electrical power from the adapter 140 via the USB cable 130. The adapter 140 can be a dedicated charging device, a desktop computer or any other device having a power supply 142 and a USB connector 170 operative to provide electrical power to a connected device 110 via the USB cable 130. The electronic device 110 includes a USB connector 120 as well as a load 118, a high voltage charger 112 with a transmit circuit 116, and a processor 119 with an associated electronic memory (not shown).

The device USB connector 120 is adapted for receiving a connector 132 (e.g., a plug or a receptacle) of the USB cable 130, and provides conductive structures 122, 124, 126 and 128 for electrical connection to the DP, DN, VBUS and GND conductors of the cable 130, respectively. In particular, the connector 120 provides the first and second conductive structures 122 and 124 for electrical connection of various components of the device 110 with data signal conductors DP (e.g., D+) and DN (e.g., D−) of the USB cable 130, as well as conductive structures 126 and 128 for connection of the load 118 to power conductors VBUS and GND of a standard USB cable 130 when the cable plug 132 is installed in the device connector 120. The connector 120, moreover, can be any suitable connector configured to interface with a standard USB cable 130, for example, an A-type or a B-type USB cable plug or receptacle having any suitable number of connections according to relevant USB standards, where certain embodiments of the connector 120 can accommodate more than four connections, and can be adapted to receive or interface with a male connector 132 (plug) or a female connector (receptacle). The conductive structures 122, 124, 126 and 128 of the electronic device 110 can be implemented in certain embodiments as connector pins or sockets soldered to conductive circuit board traces electrically connected between the HV charger 112 and the connector 120.

The device load 118 is coupled with the conductive structures 126 and 128, where the load 118 can be a power supply for operating various circuitry of the device 110, a chargeable battery system, or other electrical load in various embodiments, wherein general application of electrical power from the power supply 142 of the HV adapter 140 to the load 118 is termed herein as "charging" whether the power is used to charge a battery or is otherwise consumed by the load 118 for operation of the device 110 or both. In the illustrated embodiments, moreover, the load 118 is operative to receive electrical power via the conductive structures 126 and 128 at a nominal voltage level 5V according to conventional USB standards, or at one or more higher voltage levels, for example, 9V, 12V and/or 20V in various embodiments. As previously discussed, this high voltage charging of the load 118 advantageously facilitates fast recharging of battery-powered electronic devices 110. Moreover, certain embodiments of the device 110 may have limitations on the suitable voltage levels applied to the load 118, where the disclosed charging techniques and apparatus facilitate proper matching between charging capabilities of a connected HV adapter 140 and a particular electronic device 110.

As seen in FIG. 1, the device processor 119 in certain embodiments is selectively coupled with the conductive structures 122 and 124 via an optional switch S for communicating with a connected adapter 140, and the processor 119 is operatively coupled with one or more components of the HV charger 112 as described further hereinafter. The processor 119 can be any suitable analog and/or digital circuitry, and may be programmable including one or more processor components, programmable logic, etc. having an associated electronic memory (not shown) in various embodiments.

The charger 112 in FIG. 1 includes an HV master controller 114 with a transmit circuit 116 coupled with the first and second conductive structures 122 and 124 of the USB connector 120. The HV master 114 can be implemented in a high voltage charger 112 of the device 110, although other embodiments are possible in which the HV master 114 and the transmit circuitry 116 are implemented in an intermediate charging controller connectable to an HV adapter 114 using a USB cable 130, with one or more electronic devices 110 and associated loads 118 being connected through suitable means (e.g., including a further USB cable) to the HV master 114.

The transmit circuit 116 operates in multiple transmitter states to control an electrical condition of the data signal conductors DP and DN to facilitate configuration of a connected HV adapter 140 and a power supply 142 thereof in automated fashion in certain embodiments under control of the processor 119. For example, the processor 119 is configured in certain embodiments to perform primary and secondary detection as well as high voltage detection functions to identify a connected HV adapter 140 and to configure the adapter 140 for fast charging at a voltage level at or below a level that can be accommodated by the load 118. In specific embodiments, the processor 119 is programmed to selectively place the transmit circuit 116 in a first transmitter state to disable the transmit circuit 116 thereby instructing or configuring the adapter 140 to provide electrical power at the nominal USB voltage level 5V or to selectively place the transmit circuit 116 in a second state to instruct adapter 140 to provide electrical power to the electronic device 110 via the USB cable 130 at a high voltage level, such as 9V, 12V or 20V in specific embodiments. In the illustrated implementation, for instance, an Inter-Integrated Circuit (I²C) bus connection is provided between the processor 119 and the HV charger circuit 112 for processor control of the state of the transmit circuit 116 as described further below.

The HV adapter 140 in FIG. 1 provides a USB charger apparatus with a high voltage slave controller or circuit 150 including a removal detect circuit 152 and a select circuit 154, as well as a configuration circuit 160 and the power supply 142 as shown. In operation, the power supply 142 converts power from an external AC source 144 to provide a controlled DC voltage across the VBUS and GND conductors of the USB cable 130 for charging a connected electronic device 110. The adapter connector 170 is adapted to receive a plug or receptacle 134 of the USB cable 130 with conductive structures 172, 174, 176 and 178 for electrical connection to the DP, DN, VBUS and GND conductors of the cable 130. A first conductive structure 172 provides electrical connection to the DP data signal conductor, and a second conductive structure 174 provides electrical connection to the data signal conductor DN, with third and fourth conductive structures 176 and 178 respectively providing electrical connection to the power conductors VBUS and GND. The adapter connector 170 can be any suitable connector configured to interface with a standard USB cable 130, for example, an A-type or a B-type USB cable plug or receptacle with a suitable number of connections according to relevant USB standards, where certain embodiments of the connector 170 can accommodate more than four connections, and can be adapted to receive or interface with a male connector 132 (e.g., plug) or a female connector (e.g., receptacle).

The adapter power supply 142 is selectively operative according to one or more configuration signals 162 from the configuration circuit 160 to supply electrical power to the device 110 via the third and fourth conductive structures 176 and 178 at a nominal voltage level 5V or at least one of a plurality of high voltage levels (e.g., 9V, 12V and/or 20V in various embodiments) and may be capable of providing output current at 1 A, 3 A or 5 A. In other embodiments, the power supply 142 may implement other charging levels regarding voltage and current outputs, and may implement more or fewer combinations to provide two or more programmable output power levels including the nominal 5V USB standard charging level and at least one higher voltage output level.

The configuration circuit 160 provides the configuration signal(s) 162 at least partially according to one or more select signals 156, where the example of FIG. 1 includes a select signal 156a as further illustrated in FIGS. 3 and 5, and may optionally include a second select signal 156b (e.g., FIGS. 4 and 5 below). As illustrated, moreover, the adapter 140 includes a resistance R connected between the conductive structures 172 and 174 to provide a USB DCP compliant value, for example 100-200 ohms across the DP and DN conductors of the USB cable 130 in accordance with various USB standards. In this manner, the HV adapter 140 is fully USB compliant and universal, with the added capability of providing high voltage (e.g., rapid charging for a connected electronic device 110. Moreover, the system 100 provides the device-based transmit circuit 116 and the corresponding high voltage slave controller 150 of the adapter 140 to provide one way and/or bidirectional communications using the DP and DN cable conductors while maintaining full USB standard compliance including the presence of the 100-200 ohm data signal line impedance.

In operation, the transmit circuit 116 advantageously employs the relatively low impedance between the DP and DN lines to generate two or more distinct and detectable electrical conditions at the data signal conductive structures 172 and 174 in the adapter 140, with the removal detector circuit 152 and the select circuit 154 of the HV slave controller 150 detecting the specific electrical condition controlled by the transmit circuit 116. Moreover, the detector circuit 152 in the adapter 140 advantageously detects the presence or removal of a valid USB connection at the adapter connector 170 and selectively provides a detector output signal 153 to effectively influence the provision of the select signal or signals 156 to the configuration circuit 160 in controlling the output voltage level of the power supply 142. It is noted that the communications capabilities provided by the transmit circuit 116 on the device side and the HV slave controller 150 on the adapter side thus provide for intelligent rapid charging selectivity under control of the device 110 without the additional circuitry required for USB-PD configurations to modulate and demodulated communications signaling on the VBUS conductor of the cable 130. In this manner, a cost effective automatic means is provided for fast charging the electronic device 110 via a USB cable 130 while maintaining control in the charged device 110 of the voltage level at which power is delivered from the power supply 142 to the load 118. Furthermore, certain implementations provide significant cost advantages on the adapter side, where the detector circuit 152, the select circuit 154 and the configuration circuit 160 can be implemented in analog circuits without requiring a processor. Other embodiments are possible including processing elements in the HV adapter which can provide bidirectional communications between the device 110 and the adapter 140 along the DP and DN lines as described further below in connection with FIGS. 7 and 8.

Figure 2:
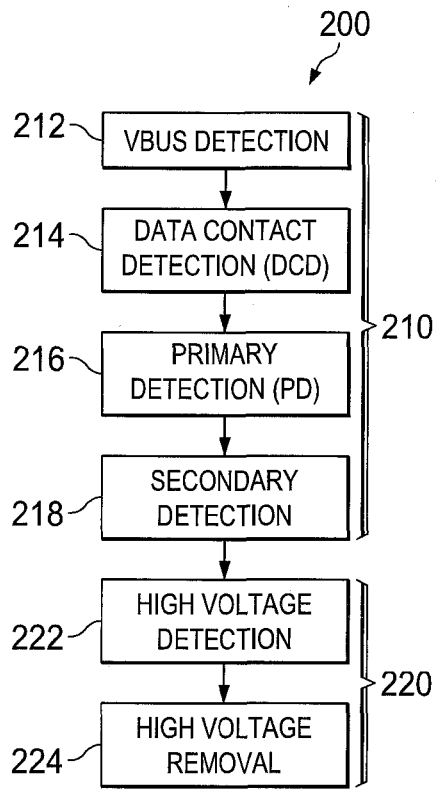
FIG. 2 is a flow diagram illustrating a method for charging the electronic device via a USB cable connection.
Figure 8:
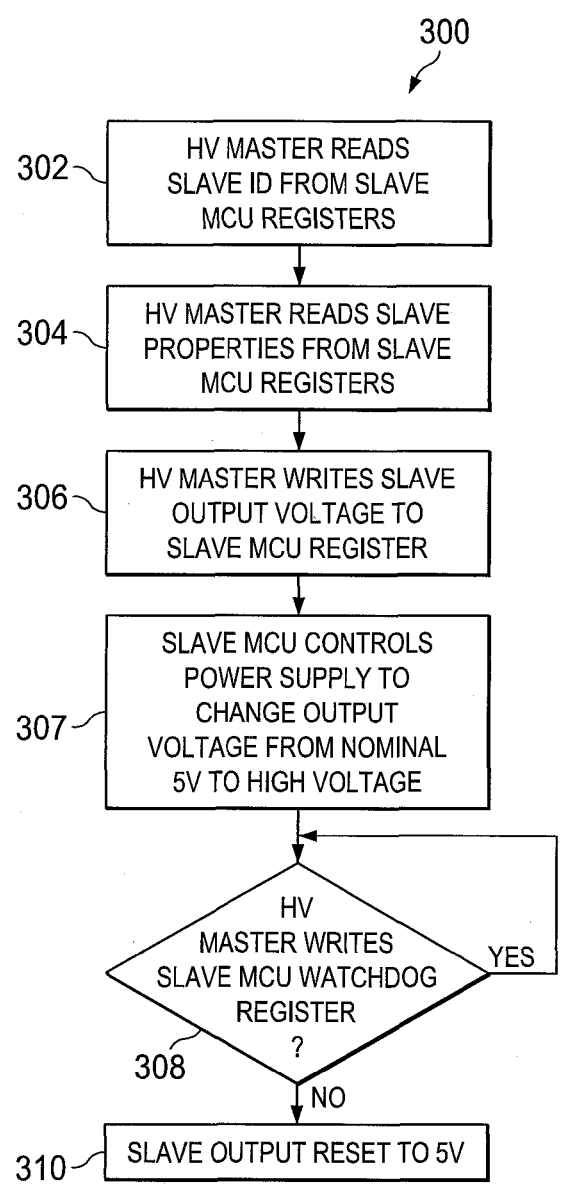
FIG. 8 is a flow diagram illustrating another method for USB charging.

Referring also to FIG. 2, a process 200 is illustrated for fast charging an electronic device via a USB cable, which can be implemented using the system 100 of FIG. 1. Although the method 200 and the method 300 of FIG. 8 are illustrated and described in the form of a series of acts or events, it will be appreciated that the various methods of the disclosure are not limited by the illustrated ordering of such acts or events except as specifically set forth herein. In this regard, except as specifically provided hereinafter, some acts or events may occur in different order and/or concurrently with other acts or events apart from those illustrated and described herein, and not all illustrated steps may be required to implement a process or method in accordance with the present disclosure. The illustrated methods may be implemented in hardware as illustrated and described above, and/or using processor-executed software, processor-executed firmware, FPGAs, logic circuitry, etc. or combinations thereof, in order to provide the intelligent charging functionality described herein, although the present disclosure is not limited to the specifically illustrated or described applications and systems.

The process 200 allows the adapter 140 to function as a conventional USB adapter (e.g., providing 5V output from the power supply 142) or to function as a high voltage adapter based on communication signaling received from the transmit circuit 116 along the DP and DN lines of the USB cable 130, and provides a high voltage protocol between the electronic device 110 and the adapter 140. At 210 in FIG. 2, the HV master 114 implements USB battery charging standard 1.2 detection processing (USB BC 1.2 protocol) to identify the connected adapter 140 as a Standard Downstream Port (SDP), Charging Downstream Port (CDP), Accessory Charger Adapter (ACA), or Dedicated Charging Port (DCP), during which the adapter 140 provides the nominal 5V voltage between VBUS and GND. This includes detection of the bus at 212, DCD data collection contact processing at 214, primary detection (PD) at 216 and secondary detection at 218 for distinguishing dedicated charging ports from charging downstream ports according to standard BC1.2 processes.

At 220 in FIG. 2, for detected dedicated charging ports, the HV master 114 implements a high voltage (HV) procedure, including HV detection at 222 by which the electronic device 110 can selectively program the HV adapter 140 to provide a higher charging voltage (e.g., 9V, 12V, 20V, etc.), with the removal detection circuit 152 of the adapter 140 selectively performing HV removal at 224 based on detection of a disconnection of the electronic device 110, in which case the power supply 142 of the HV adapter 140 is reset again to provide the nominal number 5V output level. In this manner, the adapter 140 provides a voltage output for charging the load 118 at or below a requested level as dictated by the device 110, thereby ensuring safe proper charging operation while the device 110 and the adapter 140 are properly connected to one another. Once the adapter 140 determines that the connection has been broken, the power supply 142 is reset to the nominal level, thereby remaining compliance with the USB standard for safe subsequent connection of any USB-compliant device 110. In addition, the process 200 advantageously allows the master to initiate high voltage operation and to adjust the high voltage setting and/or to revert operation to the nominal default level (e.g., 5V) without having to repeat USB BC 1.2 process 210 and without having to wait for a USB BC 1.2 protocol timeout or to restart the master or slave. Thus, the reconfiguration itself is expeditious in certain embodiments, for example, allowing fast reconfiguration by the master from 9V to 12V, etc. to quickly optimize charging parameters based on thermal requirements or other considerations, without restarting the master and slave negotiation. The same advantage is found with respect to resuming default nominal operation by appropriate signaling from the master and/or when device removal is detected, where the HV master 114 may operate the transmit circuit 116 (while still properly connected) in a first transmit state to cause the HV adapter 140 to resume charging at the nominal USB 5V output voltage level in certain embodiments without repeating BP 1.2 processing 210 and without waiting for a USB BC 1.2 protocol timeout.

As described further hereinafter, the HV protocol implemented via the device 110 and the adapter 140 can utilize one-way signaling to provide configuration data or commands through distinct detectable electrical conditions on the DP and DN lines under control of the device processor 119, or bidirectional communications embodiments are contemplated for high performance signaling (HPS) as described further in connection with FIGS. 7 and 8 below. The signaling is provided in certain embodiments described below by the processor 119 selectively placing the transmit circuit 116 into a first transmitter state or a second transmitter state for selective operation of a current circuit and a voltage source in the transmit circuit 116.

Figure 3:
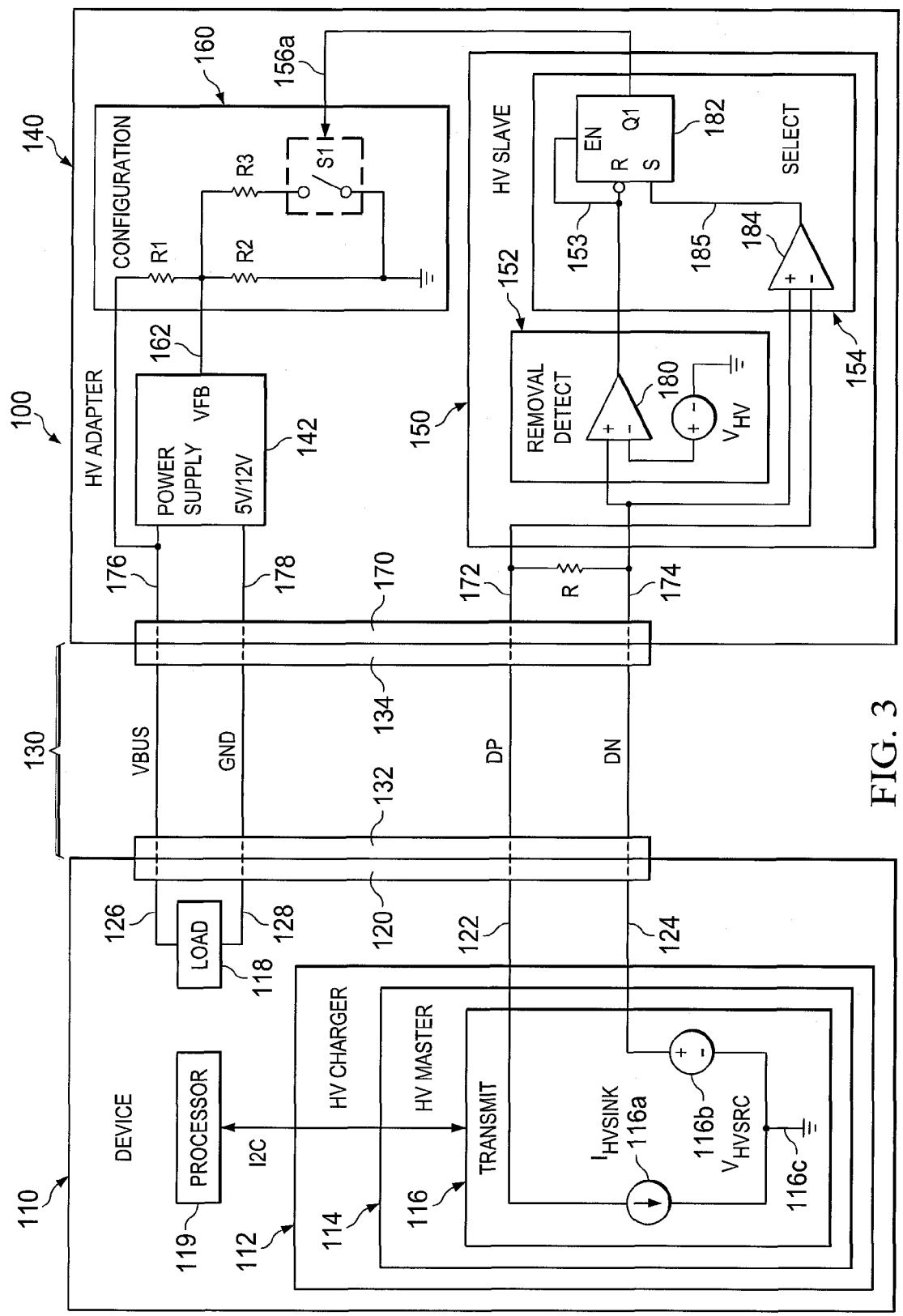
FIG. 3 is a schematic diagram illustrating a first embodiment of the transmit circuit including a current circuit and a voltage source with a high voltage slave controller in the high voltage adapter including a removal detector circuit and a select circuit for configuring and adapter power supply to operate at a selected high voltage output level.
Figure 4:
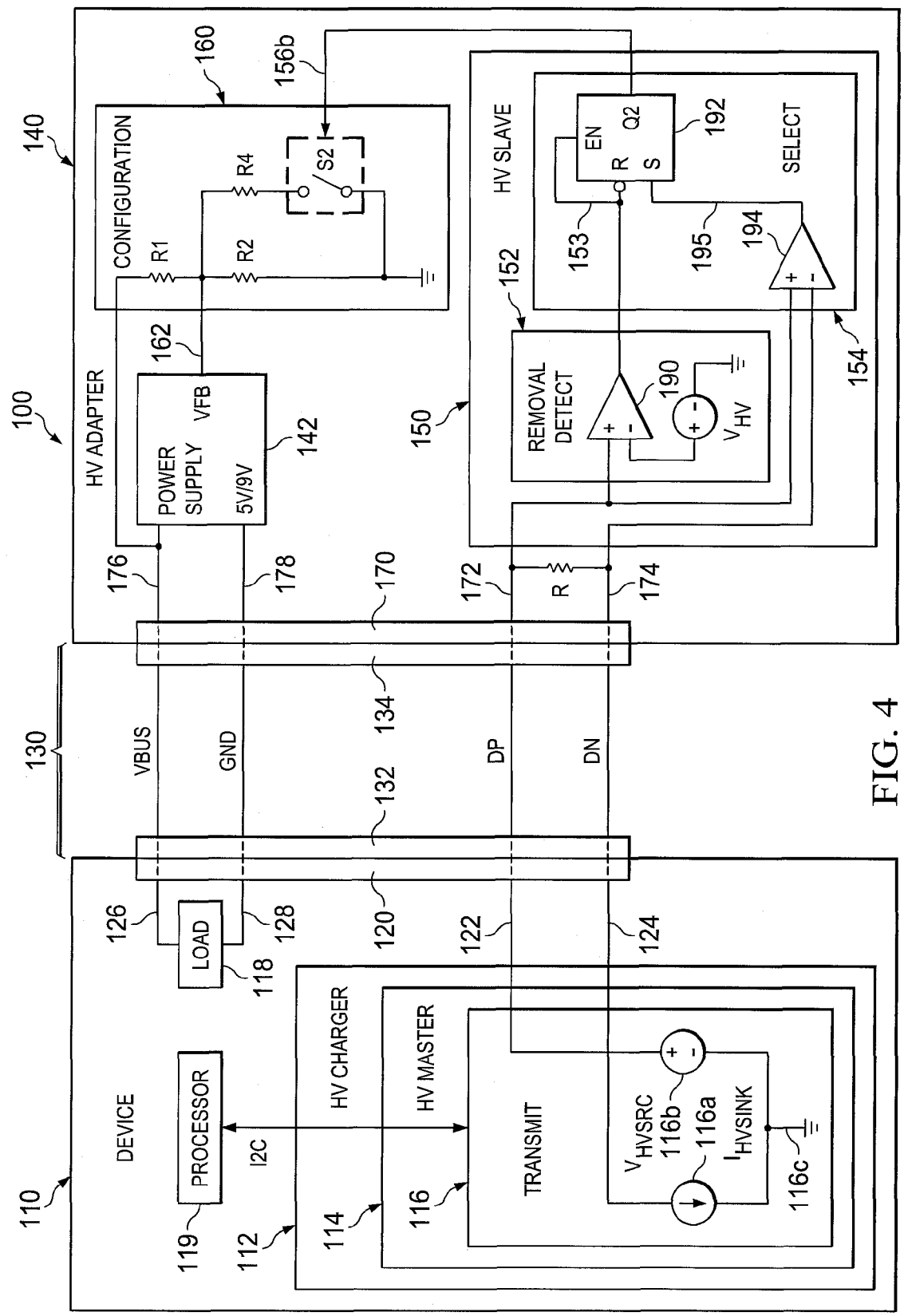
FIG. 4 is a schematic diagram illustrating a second embodiment of a transmit circuit with a current circuit and a voltage source in the electronic device for configuring a connected high voltage adapter.

Referring now to FIGS. 3 and 4, a current circuit is provided, in this example including a current sink 116a, along with a voltage source 116b of the transmit circuit 116, coupled with the USB connector 120 in the electronic device 110, and the current circuit 116a and the voltage source 116b are disabled under control of the processor 119 in the first transmitter state. This condition is detectable by the HV slave controller 150 of the adapter 140, with the controller 150 accordingly providing one or more select signals 156 so as to program or configure the power supply 142 to provide the nominal (5V) output voltage. The processor 119 is programmed in these embodiments to selectively enable the current circuit 116a in the second transmitter state to sink a non-zero current $I_{HVSINK}$ from one of the first and second conductive structures 122 and 124, and to enable the voltage source 116b in the second transmitter state to provide a non-zero voltage $V_{HVSRC}$ to the other one of the first and second conductive structures 122 and 124. The transmit circuit 116 can include any suitable circuitry for selectively enabling or disabling the current circuit 116a and voltage source 116b according to control signals or messaging from the processor 119, for example, via suitable switching circuitry (not shown in FIGS. 3 and 4). In this manner, the processor 119 can employ the transmit circuit 116 in order to implement signaling to instruct the HV adapter 140 to configure the power supply 142 so as to provide a desired charging voltage level. Moreover, the transmit circuit 116 advantageously controls the electrical conditions on the DP and DN lines using the current source 116a and the voltage source 116b to provide a detectable electrical condition on the DP and DN lines in the presence of a 100-200 ohm resistor R connected across the first and second conductive structures 172 and 174 in the adapter 140 to maintain compliance with applicable USB standards. While the illustrated embodiment provides a current circuit having a current sink 116a for selectively sinking current from the conductive structure 122, other embodiments are possible in which a current source is provided in the current circuit and configured to selectively source a predetermined non-zero current to the conductive structure 122.

FIG. 3 illustrates first embodiments of the device 110 and the HV adapter 140, where the electronic device 110 can selectively program or configure the HV adapter 140 to provide either the nominal voltage (5V) or a first high voltage output for charging the load 118 (e.g., 12V in one implementation). In this case, the current circuit 116a is coupled between the first conductive structure 122 and a circuit ground 116c, and operates in the second transmitter state to sink the current $I_{HVSINK}$ (2 mA in one non-limiting example) from the first conductive structure 122. The voltage source 116b in this embodiment is coupled between the second conductive structure 124 and the circuit ground 116c and is operative in the second transmitter state to provide the non-zero voltage $V_{HVSRC}$ (e.g., 3.6 to 4.0 V in one example) to the second conductive structure 124. In the second transmitter state, the sink current $I_{HVSINK}$ creates a voltage across the resistor R of the adapter 140, with the voltage source 116b controlling the voltage at the second conductive structure 174. In this condition for a voltage $V_{HVSRC}$=3.6V and R=200 ohms, the voltage at the conductive structure 172 is approximately 3.2 V and the voltage at the conductive structure 174 is approximately 3.6 V.

As further shown in the example of FIG. 3, the detector circuit 152 of the HV slave controller 150 includes a comparator 180 operative to compare the voltage of the first conductive structure 172 with a voltage reference $V_{HV}$ (e.g., 3.0V in one non-limiting embodiment) and provides the detector output signal 153 in a first state (high) when the DP line voltage of the structure 172 exceeds $V_{HV}$. Thus, when the processor 119 places the transmit circuit 116 in the second transmitter state (thereby enabling the current circuit 116a and the voltage source 116b), the detector circuit 152 provides a high detector output 153. The select circuit 154 in this embodiment includes a comparator 184 connected to sense the polarity of the differential voltage across the conductive structures 172 and 174 (e.g., across the resistor R), and to provide the comparator 184 output signal 185 as one of two possible states indicating the sensed polarity. In the illustrated situation of FIG. 3 with the transmit circuit 116 enabled in the second transmitter state, the comparator 184 provides a high output signal 185. The select circuit 154 in this embodiment provides a select signal 156a to the configuration circuit 160 according to the sensed polarity of the differential voltage when the detector output signal 153 is in the first state (high). The illustrated select circuit further includes a flip flop 182 with a set input S coupled to receive the comparator output signal 185, as well as an inverted reset input R and an enable input EN coupled to receive the detector output signal 153. The flip-flop output Q1 provides the select signal 156a to operate the configuration circuit 160, where the signal 156a is high in the above described condition with the transmit circuit 116 enabled by the device processor 119. It is further noted that disabling the transmit circuit 116 (or at least the voltage source 116b thereof) under control of the processor 119, or disconnection of the device 110 from the adapter 140 causes the detect circuit 152 to disable the flip-flop 182, whereby the flip-flop output Q1 and hence the select output signal 156a goes low. The enable signal provided by the detector output signal 163 in this manner provides a second state when removal is detected, and the select circuit 154 responsively provides the select signal or signals 156 in a default state to cause the power supply revert supply power to the nominal voltage level (e.g., 5V) when the detector output 153 is in the second state to maintain USB compliance.

As further seen in FIG. 3, the configuration circuit 160 is operative to provide a configuration signal 162 to control the output level of the power supply 142 at least partially according to the select signal 156a. In one possible embodiment, the configuration circuit 160 comprises a resistive divider circuit with resistances R1 and R2 coupled between the power supply output (VBUS) and a circuit ground, with an intermediate node of R1 and R2 providing the configuration signal voltage 162 to a feedback voltage input VFB of the power supply 142. In this configuration, the configuration signal 162 controls a regulation point around which the power supply 142 regulates the output voltage. In this regard, the power supply 142 can be any suitable DC supply, for example, a synchronous switching buck converter providing the output voltage between the VBUS and GND lines based on comparison of the feedback voltage at the feedback input VFB with a preset (or configurable) setpoint. A third resistance R3 is selectively connected in parallel with R2 according to the switching state of a switch S1 in order to selectively modify the feedback voltage via the signal 162 provided to the power supply 142. In this manner, operation of the switch S1 according to the select signal 156a allows modification of the configuration signal voltage 162 based on the voltage of the select signal 156.

In this case, the switch S1 is open when the select signal 156a is low, thereby disconnecting R3, with the power supply 142 regulating its output voltage according to the ratio of R1 and R2 to provide a nominal voltage output (e.g., 5V). When the removal detect circuit 152 determines that the device 110 is connected and the processor 119 of the device places the transmit circuit 116 in the second transmitter state (thereby enabling the current circuit 116a and the voltage source 116b), the select signal 156a from the HV slave controller 150 goes high to close S1. This connects R3 in parallel with R2 thereby reducing the voltage of the configuration signal 162, causing the closed loop operation of the power supply 142 to compensate by raising the output voltage applied to VBUS and GND until a steady state condition is reached. In one example, the power supply 142 accordingly provides a 12V output to the connected device 110 for fast charging based on the signaling provided from the device 110 along the DP and DN lines of the USB cable 130. The described 12V operation of the power supply 142 is merely one non-limiting example, and any suitable fast charging voltage level can be automatically provided through selection of the resistance values of R1, R2 and R3.

While the illustrated configuration circuit 160 employs a resistive divider system with one or more switching devices to generate and adjust the configuration signal 162, any suitable circuitry can be used by which a configuration signal or signals 162 is/are provided to selectively modify the output voltage of the power supply 142 based at least partially on the select signal or signals 156 from the slave controller 150. Moreover, although the configuration signal 162 is provided to a feedback input of the power supply 142, other suitable input signals can be provided from the configuration circuit 160 to modify the power supply output voltage, for instance, a voltage signal provided as a setpoint input for regulation by the power supply 142 according to an otherwise unmodified feedback signal based on the output voltage (VBUS) at the third conductive structure 176. In one non-limiting embodiment, for example, a resistive divider circuit could be connected between a fixed reference voltage and the circuit ground, with an intermediate node connected to a setpoint input of the power supply 142, and with one or more switches operable according to a signal 156 to selectively introduce further resistance in parallel with the upper divider resistance so as to raise the setpoint voltage and cause the power supply 142 to increase the VBUS voltage.

Thus, the embodiment of FIG. 3 employs signaling in which the HV adapter 140 is capable of providing charging power at the nominal 5V level or at a higher 12V output level. In this embodiment, moreover, the device 110 instructs or configures the adapter 140 for rapid charging by placing the transmit circuit 116 in the second transmitter state with the current source 116a and voltage source 116b enabled to generate a 12V power supply output for charging the load 118, with this fast charging level being maintained while the HV master 114 remains attached through the cable 130 to the adapter 140.

In certain implementations, moreover, the device processor 119 is programmed to selectively disable the current circuit 116a to conserve power while continuing to enable the voltage source 116b after placing the transmit circuit 116 in the second transmitter state. In this regard, once the select circuit flip-flop 182 has been set (Q1 high) by initial placement of the transmit circuit 116 in the second state, disabling the current circuit 116a conserves power in the connected electronic device 110 while maintenance of the voltage at the second adapter conductive structure 174 above the reference value $V_{HV}$ maintains the output signal 153 from the comparator 180 of the detect circuit 152, by which the previously set output from the flip-flop 182 is maintained. Moreover, the detect circuit 152 advantageously detects disconnection (removal) of the device 110 from the adapter 140 when the voltage at the conductive structure 174 falls below the threshold voltage $V_{HV}$, by which the flip-flop 182 is disabled with Q1 returning to a low state, causing the power supply 142 to resume operation at the nominal USB compliant voltage level (5V). Similarly, if the processor 119 sets the transmit circuit 116 back to the first state (thereby disabling the voltage source 116b), the removal detect circuit 152 in the adapter 140 will disable the flip-flop 182, causing the power supply 142 to also revert to the nominal charging voltage level. Thus, the device processor 119 can selectively switch between the nominal level and at least one higher voltage charging level as needed or desired.

While the embodiment of FIG. 3 connects the current circuit 116a in order to sink a certain amount of current from the DP line, other implementations are possible in which a transmit circuit 116 includes a current source 116a connected so as to source current to one of the conductive structures 122, 124, with the other constructive structure being connected to a voltage source 116b in order to implement a detectable electrical condition along the DP and DN lines to facilitate configuration of the adapter power supply output level under control of a device processor 119.

FIG. 4 illustrates another non-limiting embodiment of the HV master 114, in which the transmit circuit 116 again includes a current circuit 116a as well as a voltage source 116b. In this case, however, the current circuit 116a is a current sink coupled between the second conductive structure 124 and ground 116c, and is selectively operative in the second transmitter state to sink the non-zero current $I_{HVSINK}$ from the second conductive structure 124, with the voltage source 116b being coupled between the first conductive structure 122 and circuit ground 116c to provide voltage $V_{HVSRC}$ to the first conductive structure 122 in the second transmitter state. FIG. 4 further illustrates a second embodiment of the HV slave controller 150 of the HV adapter 140, with a comparator 190 of the removal detect circuit 152 comparing the voltage at the first conductive structure 172 with the reference voltage $V_{HV}$ (e.g., 3.0V) to provide a comparator output signal 153 to the enable and inverted reset inputs of an output flip-flop 192 of the select circuit 154. In this case, moreover, the select circuit 154 includes a comparator 194 with a non-inverting input connected to the first conductive structure 172 and an inverting input connected to the conductive structure 174 as shown to sense the polarity of the voltage across the resistor R and provide a comparator output signal 195 to the set (S) input of the flip-flop 192. The configuration circuit 160 in this embodiment includes a different fourth resistance R4 connected in series with a switch S2 in parallel with the resistive divider resistor R2 for selective modification of the feedback voltage via the configuration signal 162. In this case, when the voltage source 116b is activated and the current circuit 116a is activated, the flip-flop 192 provides a select output signal 156b from the Q2 flip-flop output to close the switch S2, thereby reducing the feedback voltage via signal 162 from the configuration circuit resistive divider network, causing the power supply 142 to increase the charging voltage output to a higher level, in one example, 9V.

Figure 5:
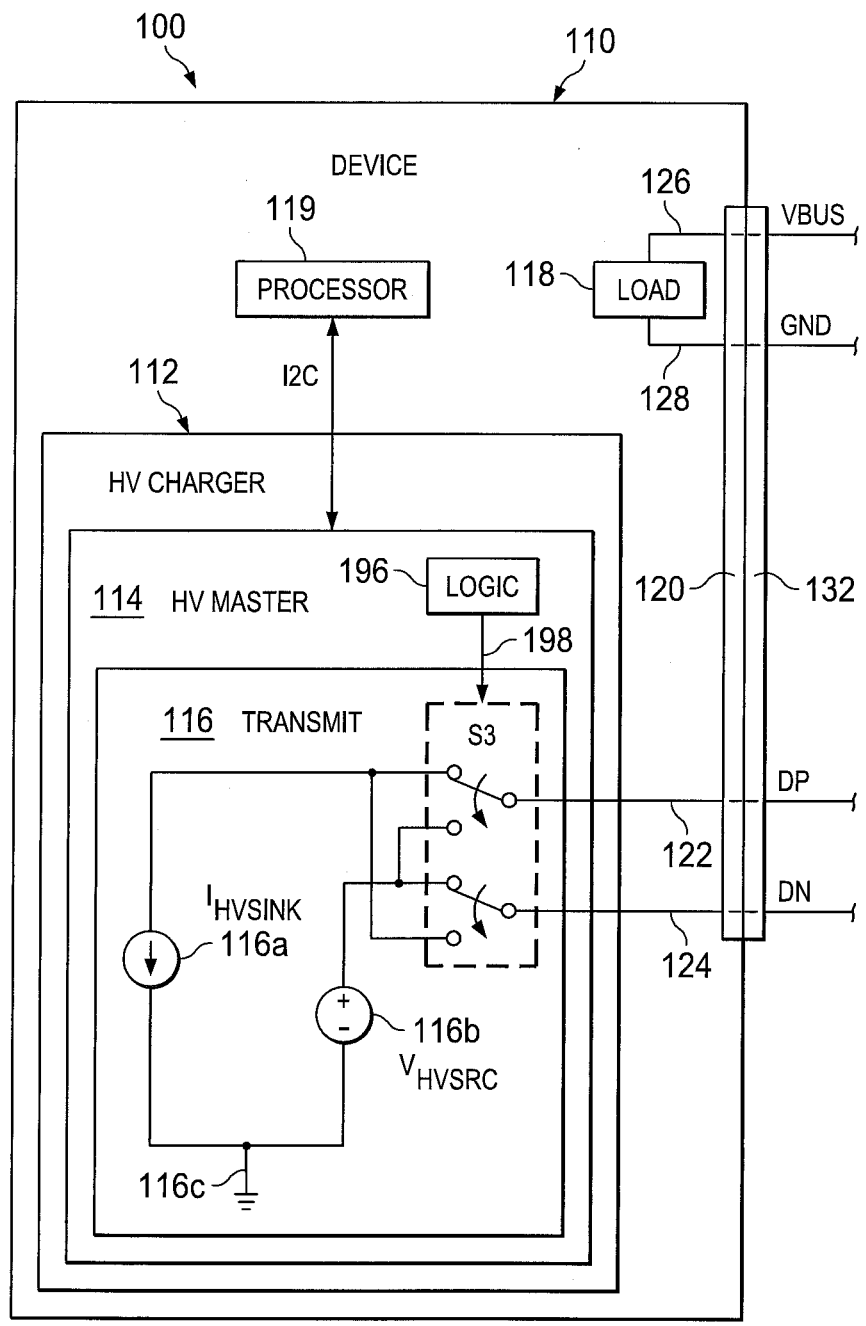
FIG. 5 is a schematic diagram illustrating a third embodiment of an electronic device having a transmit circuit with a switching circuit for selective interconnection of the current circuit and the voltage source with particular ones of the USB cable data signal conductors.
Figure 6:
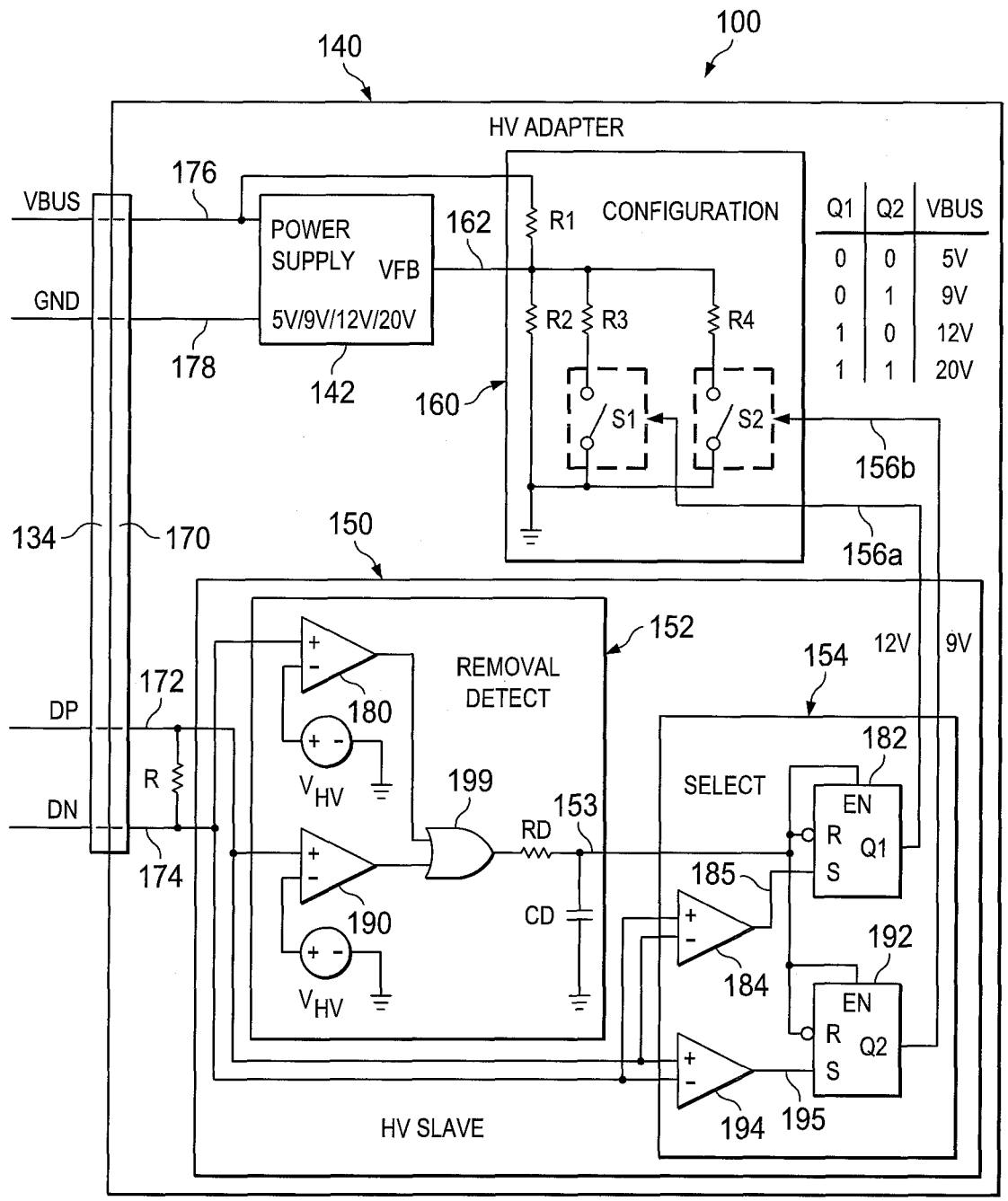
FIG. 6 is a schematic diagram illustrating a third embodiment of a high voltage adapter with a high voltage slave controller having a removal detect circuit and a select circuit operative to provide signals to a configuration circuit to set the adapter power supply to one of four different configurable output voltage levels.

Referring now to FIGS. 5 and 6, further embodiments of the device 110 and 140 are shown implementing a multi-bit high voltage configuration protocol via signaling using the transmit circuit 116 to support selection of 5V, 9V, 12V and/or 20V voltage from the HV adapter 140. As seen in FIG. 5, the HV master 114 in this case includes a switching circuit S3 operative in a first switch state (with the switching poles configured as shown) to connect the current circuit 116a for sinking current $I_{HVSINK}$ from the first conductive structure 122 and to connect the voltage source 116b to provide the non-zero voltage $V_{HVSRC}$ to the second conductive structure 124. In a second switch state, the switching circuit S3 instead connects the current circuit 116a to the second conductive structure 124 and connects the voltage source 116b to the first conductive structure 122. The state of the switching circuit S3 in certain embodiments is controlled by the processor 119, where the HV master 114 may include logic circuitry 196 directly controlling the state of the switching circuit S3 based on commands and/or signaling from the processor 119. In this manner, the processor 119 can selectively provide two different controlled electrical conditions along the DP and DN lines for high voltage (i.e. fast charging) selection, and the current circuit 116a and voltage source 160b may, but need not be, separately enabled and disabled under control of the processor 119. However, as discussed above in connection with FIGS. 3 and 4, certain embodiments allow the processor 119 to individually enable and disable the current circuit 116a and voltage source 160b, for example, to disable the current circuit 116a to conserve device power after signaling to a connected HV adapter 140 has been completed. The processor 119 in the embodiment of FIG. 5 is programmed to selectively place the transmit circuit 116 in the second transmitter state by placing the switching circuit S3 in the first switch state so as to instruct the associated high voltage adapter 140 (e.g., FIG. 6) to provide power to the device 110 via the USB cable 130 a first one of a plurality of high voltage levels (e.g., 12V). Alternatively, the processor 119 can selectively place the transmit circuit 116 in a third transmitter state by placing the switching circuit S3 in the second switch state to instruct the adapter 140 to provide charging power at a second high voltage level (e.g., 9V).

As seen in FIG. 6, this embodiment of the HV adapter 140 includes the resistor R, the removal detect circuit 152 and the select circuit 154 coupled with the first and second USB connector conductive structures 172 and 174 to receive signaling from the transmit circuit 116 of a connected device 110 (e.g., from the device 110 of FIG. 5). In this case, moreover, the HV slave controller 150 is operative to selectively distinguish between the two different electrical conditions along the DP and DN lines of the USB cable 130, thereby allowing a connected device 110 to selectively instruct the HV adapter 140 to provide up to four distinct power supply output voltage charging levels via the detect circuit 152, the select circuit 154 and the configuration circuit 160.

The removal detect circuit 152 in the embodiment of FIG. 6 provides both comparators 180 and 190 individually connected in similar fashion as the embodiments of FIGS. 3 and 4, respectively, with the comparator 180 comparing the voltage at the second conductive structure 174 with the reference voltage $V_{HV}$ and the comparator 190 comparing the voltage at the first conductive structure 172 with the reference $V_{HV}$. The outputs of the comparators 180 and 190 are provided as inputs to an OR gate 199 which provides the detector output signal 153 to the select circuit 154 indicating that at least one of the conductive structures 172, 174 is at a voltage in excess of the reference voltage $V_{HV}$. In the illustrated embodiment, the signal 153 is provided from the OR gate 199 through an optional deglitch low pass filter circuit formed by a resistor RD and a capacitor CD, which can be omitted in other embodiments.

The select circuit 154 in FIG. 6 includes first and second comparators 184 and 194 to sense the differential voltage across the resistor R, with the comparator 184 providing a select input signal "S" to a first flip-flop 182 generally as described above in connection with FIG. 3, and the second comparator 194 providing a comparator output signal 195 to the select input of a second flip-flop 192, generally as described above in connection with FIG. 4. As shown in FIG. 6, the non-inverting input of the comparator 184 is connected to the second conductive structure 174 and the inverting input of the comparator 184 is connected to the first conductive structure 172, with the input connections to the second comparator 194 being reversed. In this configuration, when the device processor 119 in FIG. 5 places the switching circuit S3 in the first switching state, the first comparator 184 in the select circuit 154 of FIG. 6 will provide a high comparator output signal 185 to the select input of the first flip-flop 182. Moreover, when the device processor 119 (FIG. 5) sets the switching circuit S3 in the second switching state, the second comparator 194 in FIG. 6 provides a high comparator output signal 195 to set the second flip-flop 192.

As further shown in FIG. 6, the configuration circuit 160 in this embodiment again provides a resistive divider circuit including resistors R1 and R2 providing the configuration signal 162 to the voltage feedback input of the power supply 142. In this case, however, individually selectable switches S1 and S2 are controlled by the signals 156a and 156b provided by the outputs Q1 and Q2 of the first and second select circuit flip-flops 182 and 192, respectively. The switch S1 is selectively operative according to the signal 156a to selectively connect the resistor R3 in parallel with R2 (closed when the signal 156a from Q1 is high), and the switch S2 is closed by a high signal 156b to selectively connect R4 in parallel with R2. In this manner, the signaling from a connected electronic device 110 over the DP and DN lines of the USB cable 130 can selectively instruct the adapter 140 to provide a first high voltage charging level (e.g., 12V when Q1=1 and Q2=0), or a second high voltage charging level (e.g., 9V when Q1=0 and Q2=1) in addition to a nominal (e.g., USB compliant) voltage level of 5V when Q1 and Q2 are both 0 based on the relative sizes of the resistors R1-R4. Other embodiments are possible, in which the resistance values are adjusted to provide any combination of multiple output voltage levels.

In addition, embodiments of the device 110 of FIG. 5 and the adapter 140 of FIG. 6 provide for programming of the device processor 119 to sequentially place the transmit circuit 116 in the second and third transmitter states in any order (e.g., initially in the second state with the switching circuit S3 connected a shown in FIG. 5, followed by the third state in which the switching circuit S3 is switched to the opposite state, or the reverse order) so as to instruct the adapter 140 to provide power at a third high voltage level. For example, the configuration circuit 160 in FIG. 6 provides for a higher output voltage setting when both switches S1 and S2 are closed, thereby connecting R2-R4 in parallel with one another to further reduce the feedback voltage provided by the configuration signal 162. In one possible implementation, this third high voltage level is 20V, although other values are possible in various embodiments through selection of the resistor values R1-R4. In this respect, placing the transmit circuit 116 in the second state operates the detect circuit 152 and the select circuit 154 to set the output signal 156a from the first flip-flop 182 to an active state, thereby closing S1, and subsequent switching of the transmit circuit 116 by the device processor 119 using switching circuit S3 causes the select circuit 154 and the removal detect circuit 152 to assert the Q2 output signal 156b from the second flip-flop 192, thereby closing switch S2 in the configuration circuit 160. As illustrated in FIG. 6, therefore, the signaling HV protocol provided by the transmit circuit 116 of the device 110 and the HV slave 150 allow selection under control of the device processor 119 of any one of four predefined output voltage charging levels, one of which is the nominal USB compliant level. Accordingly, the device 110 and the adapter 140 advantageously facilitate fast charging of the device load 118 at any suitable level at or below the level chosen or instructed by the device processor 119.

Figure 7:
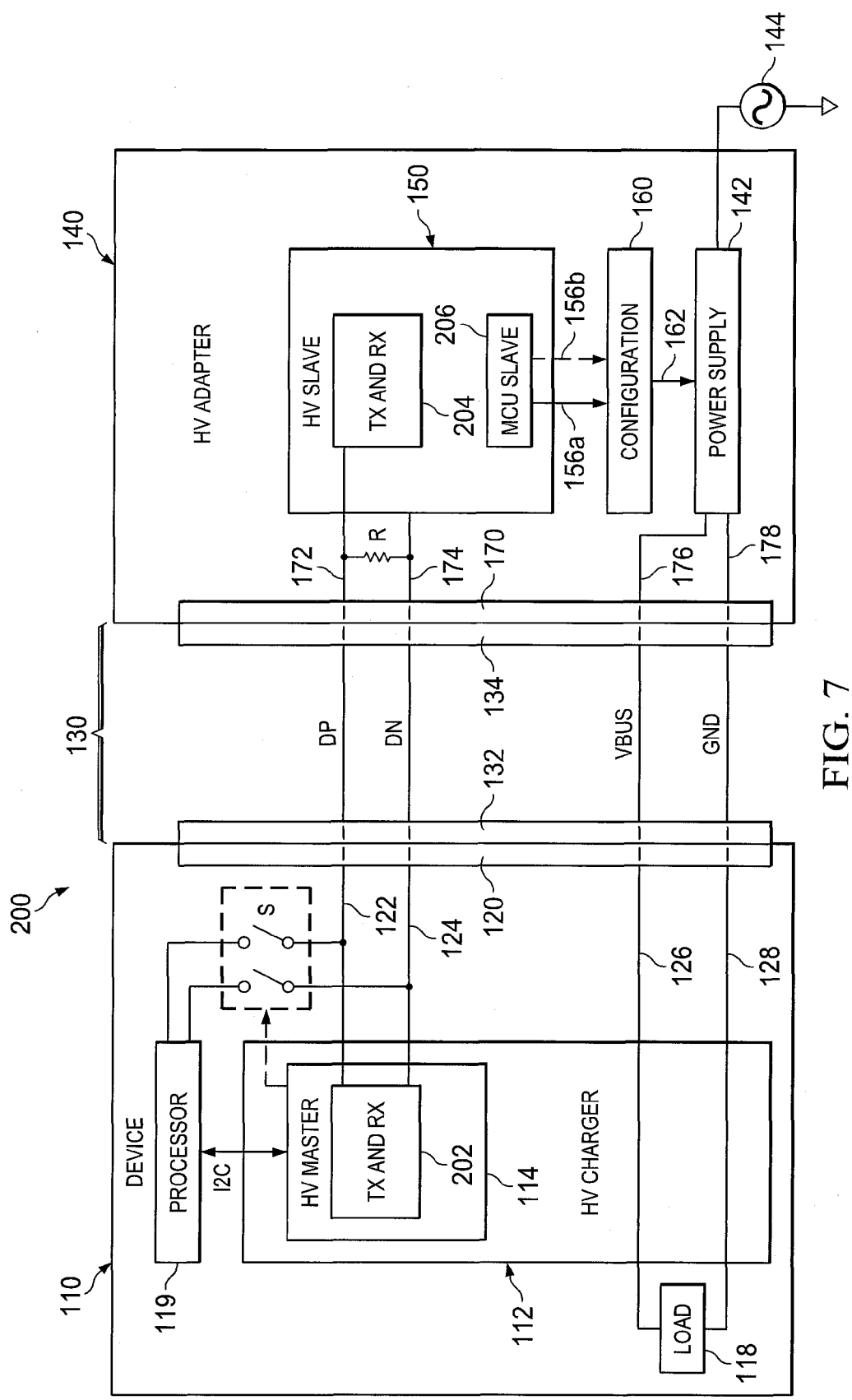
FIG. 7 is a schematic diagram illustrating another USB charging system in which the device and a connected HV adapter each include a transceiver circuit to provide bidirectional communications for exchange of data on first and second data signal conductors of the USB cable to facilitate rapid charging of the electronic device.

Referring now to FIGS. 7 and 8, FIG. 7 shows another USB charging system 200 by which a load 118 of a device 110 can be charged using power from an HV adapter 140 via the USB cable 130. In the system 200, the HV master 114 of the electronic device 110 includes a transceiver (TX & RX) operatively coupled with the first and second conductive structures 122 and 124 of the USB connector 120, and the HV adapter 140 includes an HV slave controller 150 having a transceiver 204 as well as an MCU (main control unit) slave processor or logic circuit 206 providing the select signal or signals 156 to the configuration circuit 160. Any suitable transceiver circuitry 202 and 204 can be provided which maintains USB compliance in the presence of the 100-200 ohm resistor R connected between the first and second conductive structures 172 and 174 of the adapter 140, which effectively forms a single wire for digital communications. In certain embodiments, for example, each transceiver circuit 202, 204 includes a transmit circuit 116 (e.g., as described above in connection with FIGS. 3-5) as well as suitable receiver circuitry connected to the DP and DN conductors through the corresponding USB connector and conductive structures thereof in order to distinguish between two different electrical conditions along the DP and DN conductors.

In the configuration of FIG. 7, the transceiver circuit 202 of the electronic device 110 operates under control of the processor 119 to implement a master/slave bidirectional communication protocol with the adapter 140 along the DP and DN lines, although other protocols can be used such as a multimaster implementation. In various implementations, the slave processor 206 of the adapter 114 includes general purpose I/O or read/write memory registers internal to the processor 206 or in an associated separate device (not shown) which can store configuration or instruction information received from the device 110 and can store and provide to the requesting device 110 any capability and/or status information pertaining to the capabilities and status of the adapter 140 generally and the power supply 142 thereof in particular. In this manner, the adapter 140 can provide data upon request to the device 110 to facilitate intelligent selection by the device processor 119 of an available high voltage charging level for fast charging.

The device processor 119 in the illustrated embodiment is programmed to read data from the associated high voltage adapter 140 in order to determine the high voltage capabilities (if any) of the adapter 140, and to write data to the adapter 140 to selectively instruct the associated high voltage adapter 140 to provide electrical power to the electronic device 110 via the USB cable 130 at a particular one of the high voltage levels (e.g., 9V, 12V, 20V) based at least partially on the high voltage capabilities of the associated high voltage adapter 140 via the transceiver circuit 202. The HV slave processor 206 in certain embodiments is programmed to provide data to the connected electronic device 110 via the adapter transceiver circuit 204 to indicate high voltage capabilities of the power supply 142, or these may be provided to the device 110 by read access to general purpose I/O and/or memory registers of the HV slave 150 in other embodiments. In addition, the processor 206 in certain embodiments is programmed to receive configuration data from the device 110 via the transceiver circuit 204, and to provide one or more select signals 156 to the configuration circuit 160 to set the output level of the power supply 142. Other embodiments are possible in which the HV slave controller 150 includes a detect circuit 152 and select circuit 154 such as that shown in FIG. 6 above in order to receive configuration data via the connections to the DP and DN lines from the device 110 and to provide one or more select signals 156 to the configuration circuit 160 at least partially according to the configuration data.

Certain embodiments in which the HV slave controller 150 of FIG. 7 includes a programmed processor 206 may further implement removal detection functions in a number of ways. In certain embodiments, for instance, the MCU slave processor 206 implements a watchdog timer or counter function, and the device processor 119 is programmed to repeatedly write 308 to a particular register of the associated high voltage adapter 140 after writing the configuration data to the associated high voltage adapter 140. In this manner, the HV slave controller 150 can provide the select signal or signals 156 to control the high voltage charging by the power supply 142 in a generally continuous manner until the watchdog timer or counter times out or counts down to a predefined value, at which point the slave controller 150 modifies the select signal or signals 156 so as to return the power supply 142 to operation at the nominal (e.g., 5V) output voltage level for compliance with the relevant USB standards on the assumption that the device 110 has been disconnected from the USB connection.

FIG. 8 illustrates a process 300 for USB charging of an electronic device 110 which may be implemented, for example, in the system 200 of FIG. 7. At 302, the HV master 114 of the device 110 reads a slave identification (ID) from a predefined set of registers of the MCU processor 206, and the master reads one or more slave properties, such as available charger output voltage values, at 304 from different registers. At 306 in FIG. 8, the HV master 114 writes a desired slave output voltage to the slave MCU register causing the slave MCU 206 to change the select signal or signals 156 at 307 to program a power supply 142 from a nominal (e.g., 5V) level to a corresponding output voltage level for fast charging. This charging level is maintained by the adapter 140 at 308 in FIG. 8 as long as the HV master 114 continues to write a slave MCU watchdog register, and otherwise the slave output level is reset to the nominal output voltage at 310 (e.g., 5V).

The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of multiple implementations, such feature may be combined with one or more other features of other embodiments as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

What is claimed is:

1. An electronic device, comprising:
a universal serial bus (USB) connector for receiving a USB cable for connection to an associated high voltage adapter, the USB connector comprising a first conductive structure for electrical connection to a first data signal conductor of the USB cable, a second conductive structure for electrical connection to a second data signal conductor of the USB cable, a third conductive structure for electrical connection to a first power conductor of the USB cable, and a fourth conductive structure for electrical connection to a second power conductor of the USB cable;
a load operatively coupled to receive electrical power via the third and fourth conductive structures at a nominal voltage level or at least one of a plurality of high voltage levels above the nominal voltage level;
a transmit circuit coupled with the first and second conductive structures of the USB connector, the transmit circuit selectively operative in first and second transmitter states and comprising:
a current circuit selectively operative to conduct a non-zero predetermined current through a USB compliant impedance of the associated high voltage adapter to create a non-zero differential voltage across the first and second conductive structures, the current circuit comprising one of a current source selectively operative in the second transmitter state to source the non-zero predetermined current to one of the first and second conductive structures and a current sink selectively operative in the second transmitter state to sink the non-zero predetermined current from the one of the first and second conductive structures, and a voltage source selectively operative in the second transmitter state to provide a non-zero voltage to another one of the first and second conductive structures; and a processor programmed to selectively place the transmit circuit in the first transmitter state to disable the transmit circuit to instruct the associated high voltage adapter to provide electrical power to the electronic device via the USB cable at the nominal voltage level or to selectively place the transmit circuit in the second transmitter state to instruct the associated high voltage adapter to provide electrical power to the electronic device via the USB cable at a first one of the high voltage levels.

2. The electronic device of claim 1:
wherein the first data signal conductor of the USB cable is a positive data signal conductor;
wherein the second data signal conductor of the USB cable is a negative data signal conductor;
wherein the current circuit is coupled between the first conductive structure and a circuit ground, and wherein the current circuit is selectively operative in the second transmitter state to sink the non-zero predetermined current from the first conductive structure, and
wherein the voltage source is coupled between the second conductive structure and the circuit ground and wherein the voltage source is selectively operative in the second transmitter state to provide the non-zero voltage to the second conductive structure.

3. The electronic device of claim 1:
wherein the first data signal conductor of the USB cable is a positive data signal conductor;
wherein the second data signal conductor of the USB cable is a negative data signal conductor;
wherein the current circuit is coupled between the second conductive structure and a circuit ground, and wherein the current circuit is selectively operative in the second transmitter state to sink the non-zero predetermined current from the second conductive structure; and
wherein the voltage source is coupled between the first conductive structure and the circuit ground and wherein the voltage source is selectively operative in the second transmitter state to provide the non-zero voltage to the first conductive structure.

4. The electronic device of claim 1, comprising a switching circuit operative in a first switch state to connect the current circuit to the first conductive structure and to connect the voltage source to the second conductive structure, and in a second switch state to connect the current circuit to the second conductive structure and to connect the voltage source to the first conductive structure.

5. The electronic device of claim 4,
wherein the processor is programmed to selectively place the transmit circuit in the second transmitter state by placing the switching circuit in the first switch state to cause the current circuit to sink the non-zero predetermined current from the first conductive structure and to cause the voltage source to provide the non-zero voltage to the second conductive structure instruct the associated high voltage adapter to provide electrical power to the electronic device via the USB cable at the first one of the high voltage levels; and
wherein the processor is programmed to selectively place the transmit circuit in a third transmitter state by placing the switching circuit in the second switch state to cause the current circuit to sink the non-zero predetermined current from the second conductive structure and to cause the voltage source to provide the non-zero voltage to the first conductive structure to instruct the associated high voltage adapter to provide electrical power to the electronic device via the USB cable at a second one of the high voltage levels.

6. The electronic device of claim 5, wherein the processor is programmed to sequentially place the transmit circuit in the second and third states in any order to instruct the associated high voltage adapter to provide electrical power to the electronic device via the USB cable at a third one of the high voltage levels.

7. The electronic device of claim 6, wherein the first data signal conductor of the USB cable is a positive data signal conductor; and wherein the second data signal conductor of the USB cable is a negative data signal conductor.

8. The electronic device of claim 6, comprising a transceiver circuit coupled with the first and second conductive structures of the USB connector, the transceiver circuit selectively operative to provide bidirectional communications to exchange data with the associated high voltage adapter via the first and second data signal conductors of the USB cable;
wherein the processor is programmed to:
read data from the associated high voltage adapter via the transceiver circuit to determine high voltage capabilities of the associated high voltage adapter, and
write data to the associated high voltage adapter via the transceiver circuit to selectively instruct the associated high voltage adapter to provide electrical power to the electronic device via the USB cable at a particular one of the high voltage levels based at least partially on the high voltage capabilities of the associated high voltage adapter.

9. The electronic device of claim 5, wherein the first data signal conductor of the USB cable is a positive data signal conductor; and wherein the second data signal conductor of the USB cable is a negative data signal conductor.

10. The electronic device of claim 5, comprising a transceiver circuit coupled with the first and second conductive structures of the USB connector, the transceiver circuit selectively operative to provide bidirectional communications to exchange data with the associated high voltage adapter via the first and second data signal conductors of the USB cable;
wherein the processor is programmed to:
read data from the associated high voltage adapter via the transceiver circuit to determine high voltage capabilities of the associated high voltage adapter, and
write data to the associated high voltage adapter via the transceiver circuit to selectively instruct the associated high voltage adapter to provide electrical power to the electronic device via the USB cable at a particular one of the high voltage levels based at least partially on the high voltage capabilities of the associated high voltage adapter.

11. The electronic device of claim 1, comprising a transceiver circuit coupled with the first and second conductive structures of the USB connector, the transceiver circuit selectively operative to provide bidirectional communications to exchange data with the associated high voltage adapter via the first and second data signal conductors of the USB cable;
wherein the processor is programmed to:
read data from the associated high voltage adapter via the transceiver circuit to determine high voltage capabilities of the associated high voltage adapter, and
write configuration data to the associated high voltage adapter via the transceiver circuit to selectively instruct the associated high voltage adapter to provide electrical power to the electronic device via the USB cable at a particular one of the high voltage levels based at least partially on the high voltage capabilities of the associated high voltage adapter.

12. The electronic device of claim 11, wherein the processor is programmed to repeatedly write to a particular register of the associated high voltage adapter after writing the configuration data to the associated high voltage adapter.

13. The electronic device of claim 1, wherein the processor is programmed to selectively disable the current circuit after placing the transmit circuit in the second transmitter state to conserve power.

14. A Universal Serial Bus (USB) charger apparatus, comprising:
   a connector for receiving a USB cable, the connector comprising a first conductive structure for electrical connection to a first data signal conductor of the USB cable, a second conductive structure for electrical connection to a second data signal conductor of the USB cable, a third conductive structure for electrical connection to a first power conductor of the USB cable, and a fourth conductive structure for electrical connection to a second power conductor of the USB cable;
   a power supply coupled with the third and fourth conductive structures and selectively operative to supply electrical power to a connected electronic device via the third and fourth conductive structures at a nominal voltage level or at least one of a plurality of high voltage levels above the nominal voltage level at least partially according to at least one configuration signal;
   a USB compliant resistance coupled across the first and second conductive structures;
   a configuration circuit operatively coupled with the power supply to provide the at least one configuration signal at least partially according to at least one select signal; and
   a controller coupled with the first and second conductive structures, the controller comprising:
      a detector circuit operative to compare a voltage of at least one of the first and second conductive structures with a voltage reference and to provide a detector output signal in a first state when the voltage of the at least one of the first and second conductive structures exceeds the voltage reference, to provide the detector output signal in a different second state when the voltage of the at least one of the first and second conductive structures is less than or equal to the voltage reference, and to provide the detector output signal in the second state in the absence of the voltage of the at least one of the first and second conductive structures, and
      a select circuit operative to sense a polarity of a differential voltage across the first and second conductive structures, to selectively provide the at least one select signal to the configuration circuit according to the sensed polarity of the differential voltage when the detector output signal is in the first state and to provide the at least one select signal in a predetermined default state to cause the power supply to supply electrical power to the connected electronic device via the third and fourth conductive structures at the nominal voltage level when the detector output signal is in the second state.

15. The USB charger apparatus of claim 14, wherein the select circuit comprises:
   at least one comparator having a first input connected to the first conductive structure, a second input connected to the second conductive structure and an output providing a comparator output signal according to the sensed polarity of the differential voltage; and
   at least one flip flop with a set input coupled to receive the comparator output signal, an inverted reset input coupled to receive the detector output signal, an enable input coupled to receive the detector output signal, and an output operative to provide the at least one select signal according to the sensed polarity of the differential voltage when the detector output signal is in the first state and to provide the at least one select signal in the predetermined default state when the detector output signal is in the second state.

16. The USB charger apparatus of claim 14, wherein the configuration circuit is operative to provide the at least one configuration signal at least partially according to a plurality of binary select signals; and wherein the controller is operative to provide the plurality of binary select signals according to the sensed polarity of the differential voltage and the detector output signal.

17. The USB charger apparatus of claim 14, wherein the configuration circuit comprises:
   a resistive divider circuit comprising: first and second resistances coupled between an output terminal of the power supply and a circuit ground, and an intermediate node connecting the first and second resistances to control a configuration signal voltage provided to a feedback voltage input of the power supply;
   a third resistance; and
   a switching circuit coupled to selectively connect the third resistance in parallel with one of the first and second resistances to modify the configuration signal voltage when the at least one select signal is in a first state.

18. The USB charger apparatus of claim 14, wherein the controller comprises a transceiver circuit coupled with the first and second conductive structures, the transceiver circuit selectively operative to provide bidirectional communications to exchange data with the connected electronic device via the first and second data signal conductors of the USB cable; and
   wherein the select circuit comprises a processor programmed to:
      provide data to the connected electronic device via the transceiver circuit to indicate high voltage capabilities of the power supply,
      receive configuration data from the connected electronic device via the transceiver circuit, and
      provide the at least one select signal to the configuration circuit at least partially according to the configuration data.

19. A method for fast charging an electronic device via a Universal Serial Bus (USB) cable, the method comprising:
   detecting connection of a high voltage adapter to the electronic device via a USB cable using a USB compliant detection process;
   selectively sourcing or sinking a non-zero predetermined current to or from one of a first data signal conductor and a second data signal conductor of the USB cable while providing a non-zero voltage to another one of the first and second data signal conductors to configure the connected high voltage adapter to provide charging power to the electronic device via first and second power conductors of the USB cable at a particular high voltage level above a nominal voltage level;
   selectively adjusting provision of the charging power by the connected high voltage adapter to one of a second particular high voltage level and a default voltage level without repeating the USB compliant detection process; and automatically adjusting provision of the charging power by the high voltage adapter to the default voltage level without repeating the USB compliant detection process in response to disconnection of the high voltage adapter from the electronic device.

20. The method of claim 19, comprising:

reading data from the connected high voltage adapter via the first and second data signal conductors to determine high voltage capabilities of the connected high voltage adapter; and writing configuration data to the connected high voltage adapter via the first and second data signal conductors to selectively instruct the connected high voltage adapter to provide electrical power to the electronic device via the first and second power conductors of the USB cable at a particular one of a plurality of high voltage levels based at least partially on the high voltage capabilities of the connected high voltage adapter.

* * * * *